July 22, 1969          C. H. KEELER          3,456,327

METHOD OF MOUNTING A MAGNIFYING ATTACHMENT ON A SPECTACLE LENS

Filed Sept. 16, 1966          2 Sheets-Sheet 1

INVENTOR
Charles H. Keeler
BY
Stevens, Davis, Miller & Mosher
ATTORNEYS

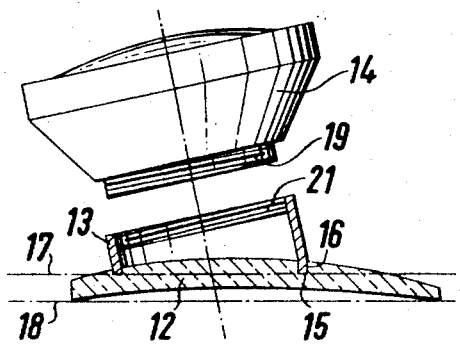
FIG.2.
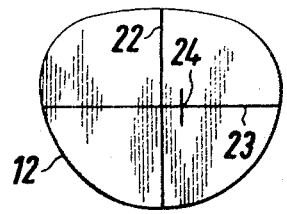
FIG.3.
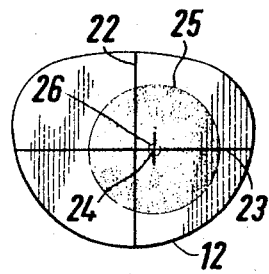
FIG.4.
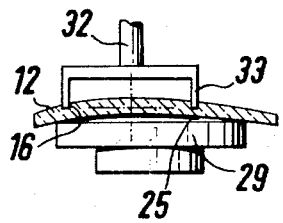
FIG.5.
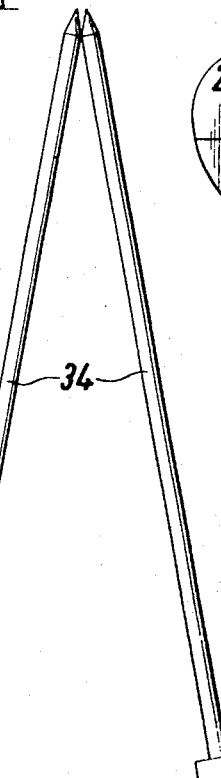
FIG.7.
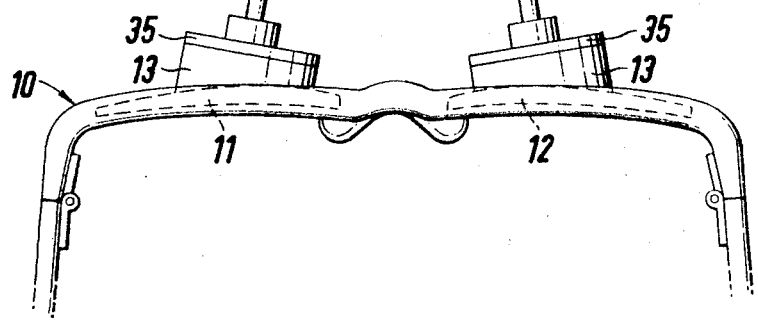
INVENTOR
Charles H. Keeler
BY
Stevens, Davis, Miller & Mosher
ATTORNEYS United States Patent Office 3,456,327
Patented July 22, 1969

3,456,327
METHOD OF MOUNTING A MAGNIFYING
ATTACHMENT ON A SPECTACLE LENS
Charles H. Keeler, Sefton Lawn, Clewer Green,
Windsor, Berkshire, England
Filed Sept. 16, 1966, Ser. No. 579,898
Claims priority, application Great Britain, Jan. 26, 1966,
3,537/66
Int. Cl. B23q 17/00; G02b 25/00
U.S. Cl. 29—406                                   2 Claims

ABSTRACT OF THE DISCLOSURE

A method of mounting a magnifying attachment on a spectacle lens comprising the steps of determining the optical center of the spectacle lens in accordance with the pupillary distance of the user, temporarily marking this opitcal center and mounting the magnifying lens in a jig on a work table. The correct position is then marked on the lens and a circular groove is cut on its front face and a metal or plastic sleeve is secured to the lens by cementing and the magnifying lens is subsequently fitted to the sleeve.

---

This invention relates to the mounting on spectacles of magnifying attachments comprising telescope units or single lenses of glass or plastics which are provided to enable users having low visual acuity to read and view objects under magnification when fitted for binocular or monocular use, and more particularly to a method of mounting a magnifying attachment on a spectacle lens.

It has already been proposed to provide magnifying attachments for this purpose which are attached directly to spectacle lenses, and it is the object of the present invention to provide an improved method of mounting the said attachments on the spectacle lenses so as to facilitate an improved construction of spectacles provided with such attachments.

According to one aspect of the invention, in a pair of spectacles having a magnifying attachment on one or both lenses, the magnifying attachment is mounted on a metal or plastics sleeve the rear edge of which is embedded and secured by cement in a circular groove formed in the front surface of the lens.

In a pair of spectacles having magnifying attachments mounted on both lenses the grooves are so formed that the bottoms thereof lie in planes substantially parallel to the general planes of the lenses, and the orientation of the sleeve to cause the optical axes of the magnifying attachments to meet at the desired common point of focus is achieved by suitably inclining the planes of the rear edges of said sleeves to their longitudinal axes.

Conveniently, the sleeve is internally screw threaded at its forward end to mate with a corresponding screw thread on the magnifying attachment.

According to the principal aspect of the invention, a method of mounting a magnifying attachment on a spectacle lens comprises the steps of determining the optical centre of the lens through which the optical axis of the attachment is to pass in accordance with the pupillary disstance of the user, temporarily securing a disc to the rear face of the lens with its centre coincident with said optical centre determined position, mounting the lens back-downwards in a jig so that it lies flat on a supporting surface, positioning the jig on a worktable so that the disc is positioned concentrically with a trepanning tool mounted on a vertical spindle, cutting a circular groove in the front face of the lens with said tool, removing the disc, securing a metal or plastics sleeve to said lens by cementing the rear edge into said groove, and fitting the magnifying attachment to said sleeve.

Further, in the method of this invention, a mounting for a magnifying attachment on a spectacle lens comprises a sleeve of metal or plastics material the rear edge of which is embedded and secured by cement in a circular groove formed in the front surface of the lens.

The invention is hereinafter described with reference to the accompanying drawings, in which:

FIGURE 2 is a sectional plan, on a larger scale than FIGURE 1, showing a spectacle lens with a sleeve mounted thereon and a magnifying attachment for mounting in the sleeve;

FIGURE 3 is a front view of a spectacle lens marked to show the position of the centre of a sleeve to be secured thereto;

FIGURE 4 is a view similar to FIGURE 3, showing a disc secured to the rear face of the lens;

FIGURE 5 is a diagram illustrating the method of grooving the lens;

FIGURE 7 is a plan view of a spectacle frame, with sleeves mounted on the lenses, showing a method of checking and adjusting the orientation of the axes of the said sleeves.

Figure 1:
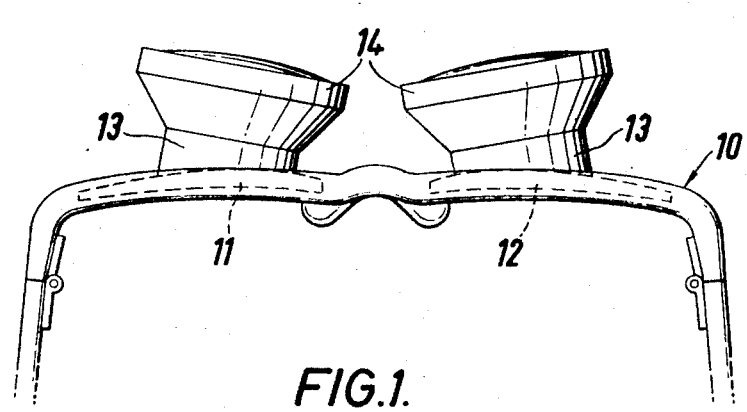
FIGURE 1 is a plan view of a pair of spectacles on both lenses of which are mounted magnifying attachments.

Referring to the drawings, and particularly to FIGURE 1 thereof, a spectacle frame is shown at 10, the lenses mounted thereon being shown in dotted lines at 11 and 12. Each lens has mounted thereon a cylindrical sleeve 13, of metal or plastics material, the sleeves being oriented so that their axes converge in a forward direction, and on each sleeve there is mounted a magnifying attachment 14 which may be a telescope unit or a mount carrying a single magnifying lens made of glass or plastics material.

As shown in FIGURE 2, each sleeve 13 has its rear edge 15 in a plane oblique to its axis (the axis being indicated by a chain-dotted line), the said rear edge being fitted into a circular groove 16 in the front face of the lens. The bottom of the groove 16 lies in a plane, represented by the line 17 in FIGURE 2, parallel to the plane represented by the line 18 in that figure which is perpendicular to the geometric axis of the lens and is referred to herein as "the general plane of the lens." The orientation of the axis of the sleeve 13 relative to the general plane of the lens is therefore determined by the obliquity of the edge 15 of the sleeve, and the groove can be formed without regard to the degree of such obliquity, so that, although its depth may vary due to the curvature of the lens surface, it is continuous through 360°.

The sleeve is secured in the grove by being embedded in cement in the said groove.

The magnifying attachment 14, as shown in the drawing, is externally screw-threaded at 19 to engage an internal screw thread 21 in the forward end of the sleeve, which forward end is in a plane perpendicular to the axis of the sleeve.

In preparing a pair of spectacles having magnifying attachments according to the present invention, a frame and lenses are selected, the lens having any corrections necessary for the prospective user. The lenses are marked, as shown with reference to the lens 12 in FIGURE 3, with crossed vertical and horizontal lines 22 and 23 intersecting at a point corresponding to the geometric centre of the lens, and a point 24 is marked on the horizontal line 23, offset towards the nasal side of the lens by a distance, depending on the pupillary distance of the prospective wearer and the focal length of the magnifying attachment to be fitted, the offset distance being such that the point 24 lies on a straight line extending from the centre of the eye to the desired point of convergence of the optical axes of the attachment and is the optical centre of the spectacle lens. A disc 25, with a hole 26 in its centre, is adhesively secured to the rear surface of the lens with its centre coincident with the point 24, the diameter of the disc being the same as the external diameter of the groove to be cut in the front surface of the lens.

Figure 6:
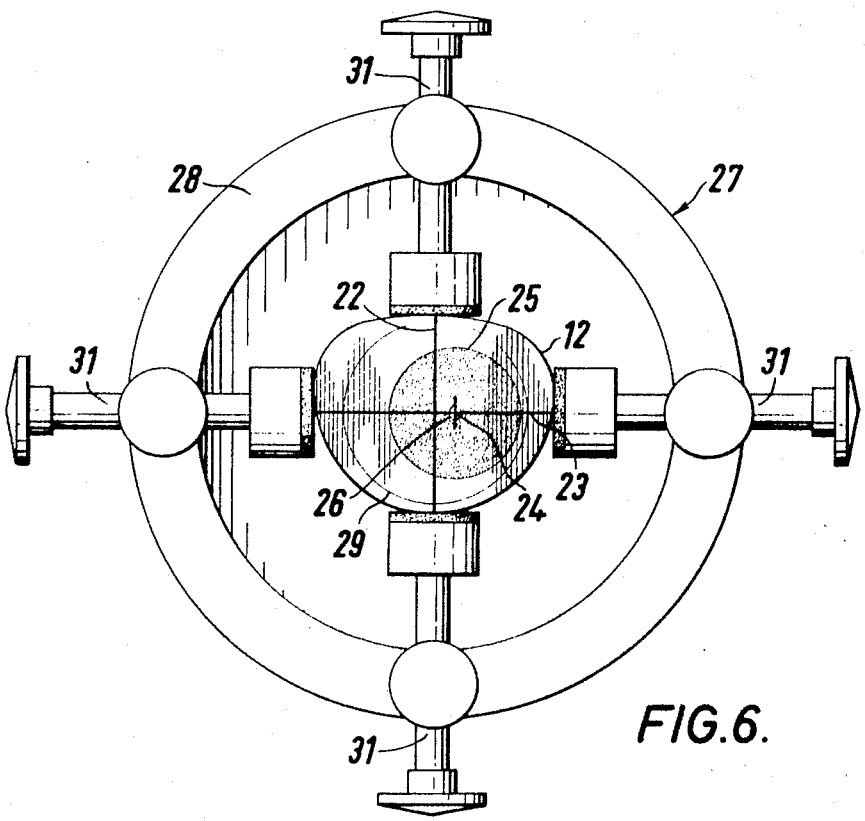
FIGURE 6 is a plan view of a jig for holding the lens during the grooving operation.

Each lens in turn is then set up in a jig 27, FIGURE 6, comprising a base with an upstanding cylindrical rim 28 and a central flat circular horizontal surface 29 to receive the lens, which is clamped in position on the surface 29, with its front face upwards, by four screws 31 mounted in the rim 28, the geometric centre of the lens being positioned at the centre of the surface 29. The jig 27 is placed on a worktable underneath a vertical rotatable spindle 32 (FIGURE 5) carrying a trepanning tool 33. The jig is positioned to bring the trepanning tool 33 concentric with the disc 25, and is fixed in position, for example by magnetic means. The trepanning tool is then operated to cut the circular groove 16 in the front surface of the lens.

Due to the curvature of the lens surface, the groove may vary in depth about its circumference, but its bottom surface will be parallel to the flat surface 29, which is itself parallel to the general plane of the lens.

A sleeve 13 of metal or plastics material, of a thickness such that it will fit into the groove 16, and having its rear edge 15 in a plane inclined to its axis at a predetermined angle depending on the focal length of the magnifying attachment to be used, is then taken, grinding paste is applied to its rear edge, and it is placed in the groove and rotated to-and-fro to perform a grinding operation. The grinding paste is then cleaned off, and the sleeve 13 is secured in the groove 16 by means of a cement, being set to the required orientation relative to the lens. The disc 25 is then removed and, when both lenses have had the sleeves 13 fixed to them, they are assembled in the spectacle frame and the magnifying attachments 14 are screwed into them.

It will be apparent that, by providing a groove in the lens to receive the sleeve, a much firmer attachment is provided than would be the case if the sleeve were merely cemented to the lens surface. Moreover, the rear end of the sleeve does not have to be shaped to conform to the curvature of the lens, and a sleeve having the angle of the plane of its rear edge to its longitudinal axis at a predetermined value will suit any pair of spectacles provided with telescopic attachments of a given focal length, so that a limited range of sleeves will suit all normal requirements.

Since spectacle frame fronts are usually slightly bowed transversely, so that the general planes of the lenses are inclined rearwardly from the nose bridge, the angles of the rear edges of the sleeves are selected to allow for such bowing, or the lens support of the jig can be inclined to the axis of the trepanning tool spindle to compensate for the bowed front of the spectacle, so that the planes of the bottoms of the grooves are slightly inclined to the general plane of the lenses, the bowing of the frame front being so slight that the said two planes are still substantially parallel.

To check that the magnifying attachments are correctly oriented, pointers 34 as shown in FIGURE 7, having discs 35 mounted on one end thereof which are screw-threaded to engage in the sleeve 13 are mounted in the sleeves, the pointers 34 having such a length that they meet at the desired point of convergence of the axes of the attachments. The spectacle frame front can then be manipulated to correct any small errors of orientation of the sleeves 13 in both the horizontal and vertical planes.

If a magnifying attachment is mounted on only one lens of a pair of spectacles, the sleeve 13 to support it may be mounted with its axis normal to the general plane of the lens.

I claim:
1. A method of mounting a magnifying attachment on a spectacle lens comprising the steps of determining the optical centre of the lens through which the optical axis of the attachment is the pass in accordance with the pupillary distance of the user, temporarily securing a disc to the rear face of the lens with its centre coincident with the said optical centre, mounting the lens back-downwards in a jig so that it lies flat on a supporting surface, positioning the jig on a worktable so that the disc is positioned concentrically with a trepanning tool mounted on a vertical spindle, cutting a circular groove in the front face of the lens with said tool, removing the disc, securing a metal or plastics sleeve to said lens by cementing the rear edge into said groove, and fitting the magnifying attachment to said sleeve.

2. A method of producing a pair of spectacles with magnifying attachments on both lenses including the steps of assembling the magnifying attachments with the lenses as claimed in claim 1, wherein the sleeves are formed with their rear edges in planes at an angle to their axes such that when the sleeves are attached to the lenses the said axes meet substantially at the points of focus of the magnifying attachments and, before the said magnifying attachments are fitted to the sleeves, pointers of a length such that their tips are at the points of focus of the magnifying attachments are mounted on the sleeves and adjustments are made to the spectacle frame front if necessary to bring the tips of the pointers together.

References Cited

UNITED STATES PATENTS

| 1,837,312 | 12/1931 | Arms | 29—406 |
| 2,010,257 | 8/1935 | Fehse | 29—557 |
| 2,765,523 | 10/1956 | Vaughan | 29—406 |

THOMAS H. EAGER, Primary Examiner

U.S. Cl. X.R.

29—557; 350—146